United States Patent
Cloutier et al.

(10) Patent No.: US 7,575,502 B2
(45) Date of Patent: Aug. 18, 2009

(54) METHOD OF OPERATING HONING FEED SYSTEM HAVING FULL CONTROL OF FEED FORCE, RATE, AND POSITION

(75) Inventors: Daniel R. Cloutier, Clive, IA (US); Timothy P. Hoth, St. Peters, MO (US); Russell L. Jacobsmeyer, Labadie, MO (US)

(73) Assignee: Sunnen Products Company, St. Louis, MO (US)

( * ) Notice: Subject to any disclaimer, the term of this patent is extended or adjusted under 35 U.S.C. 154(b) by 0 days.

(21) Appl. No.: 12/119,145

(22) Filed: May 12, 2008

(65) Prior Publication Data

US 2008/0220696 A1    Sep. 11, 2008

Related U.S. Application Data

(62) Division of application No. 11/596,836, filed on Nov. 17, 2006, now Pat. No. 7,371,149.

(51) Int. Cl.
*B24B 49/00* (2006.01)
*B24B 51/00* (2006.01)

(52) U.S. Cl. .............. 451/5; 451/11; 451/27; 451/51; 451/61; 451/119; 451/127; 700/172; 700/181

(58) Field of Classification Search .............. 29/563, 29/888.07; 318/603; 451/5, 11, 27, 51, 61, 451/76, 108, 119, 124, 127; 700/164, 172, 700/174, 181

See application file for complete search history.

(56) References Cited

U.S. PATENT DOCUMENTS

| | | | |
|---|---|---|---|
| 3,032,932 A * | 5/1962 | Bargren | 451/124 |
| 3,410,028 A * | 11/1968 | Estabrook | 451/1 |
| 3,849,940 A | 11/1974 | Yoshino et al. | 51/34 C |
| 4,187,644 A | 2/1980 | Fitzpatrick | 51/34 D |
| 4,397,658 A | 8/1983 | Vanderwal, Jr. | 51/72 R |
| 4,455,789 A | 6/1984 | Gehring | 51/34 J |
| 4,463,490 A * | 8/1984 | Saito et al. | 29/566.1 |
| 4,679,357 A | 7/1987 | Richter et al. | 51/281 P |
| 4,823,061 A | 4/1989 | Boulton et al. | 318/603 |
| 4,887,221 A * | 12/1989 | Davis et al. | 700/181 |
| 5,042,202 A * | 8/1991 | Klein et al. | 451/124 |
| 5,095,662 A | 3/1992 | Grimm et al. | 51/165.71 |
| 6,920,678 B2 | 7/2005 | Ooe et al. | 29/563 |
| 7,189,143 B2 * | 3/2007 | Klein | 451/11 |
| 7,371,149 B2 * | 5/2008 | Cloutier et al. | 451/5 |

FOREIGN PATENT DOCUMENTS

| | | |
|---|---|---|
| EP | 0081383 | 6/1983 |
| EP | 0575675 | 12/1993 |

* cited by examiner

*Primary Examiner*—Timothy V Eley
(74) *Attorney, Agent, or Firm*—Haverstock Roberts LLP

(57) ABSTRACT

The feed system for a honing machine provides a capability to dynamically correct in real time errors in bore size inferred arising from variations in feed force, and a method of operation of the same. The system allows a user to select between rate and force controlled honing modes, which provides one or more of the advantages of both modes. The system provides capabilities for automatic rapid automatic bore wall detection, compensation for elasticity of elements of the feed system and honing tool, and automatic tool protection. The system is automatically operable using feed force, feed rate and positional information for honing a work piece to one or more target parameters, such as one or more in-process sizes and a final size.

15 Claims, 9 Drawing Sheets

METHOD OF OPERATING HONING FEED SYSTEM HAVING FULL CONTROL OF FEED FORCE, RATE, AND POSITION

This application is a division of patent application Ser. No. 11/596,836, filed Nov. 17, 2006 now U.S. Pat. No. 7,371,149, and also claims the benefit of U.S. Provisional Application No. 60/607,742, filed Sep. 7, 2004.

TECHNICAL FIELD

This invention relates to a feed system for a honing machine, and more particularly, to a feed system automatically operable using feed force, feed rate and positional information for honing a work piece to one or more target parameters, such as one or more in-process sizes and a final size.

BACKGROUND ART

Traditional honing feed systems can be classified into two types: 1) Force controlled, and 2) Rate controlled. In a force controlled system, a constant or controlled force is applied to the feed rod/wedge of the honing tool. The force can be applied by a spring, a cylinder, or other means. A measurement system or a mechanical trigger detects when the wedge has reached a point that is either known or inferred to be the finished bore size. In a rate controlled feed system, a motor, typically controlled by feedback from an encoder, moves the feed rod/wedge at a constant or controlled rate. The bore size is inferred from the encoder count and can be calibrated or compensated for through an interactive user interface.

Each type of feed system has is own strengths and limitations. In a force controlled feed system one advantage is speed. Fast, (nearly instantaneous) expansion of honing stones to the point of contact with the workpiece bore and similarly fast retraction at the end of the honing cycle are possible. In constant force systems, the wedge and feed system elasticity does not affect final bore size. There is no tool breakage or excessive abrasive wear due to excessive feed forces. And, workpieces with less stock to be removed will be honed faster, i.e. no time is wasted while the honing stones expand at a relatively slow rate (selected for cutting) through the entire range of the maximum anticipated stock removal. Disadvantages include that cycle time cannot be controlled, i.e. stones that glaze will hone with increasingly longer cycle times. And, abrasives make rapid contact with rough or out of round bores causing tool or fixture damage and/or wearing abrasive stones excessively.

Advantages of a rate controlled feed system include electronic control of size, and electronic display of feed position during cycle without a separate measuring system. And, honing cycle time will be consistent and unaffected by changes in abrasive condition. Disadvantages include that feed rod force is unknown. Feed forces can reach levels that endanger the tool, fixture, or operator. Variations in the pre-process bore size will result in either wasted time or dangerous crash conditions. The honing process must start with the honing tool at some initial size. This position must be set for some point slightly smaller than the smallest anticipated pre-process bore size. Honing a workpiece with a larger initial bore size must therefore include some wasted "air-cutting" time. Any workpiece with an initial bore size that is smaller than the initial tool size will be impacted violently as the abrasive feeds into the bore with full force during the tool's rapid expansion to the starting size. Such impact is likely to damage tool or the workpiece. And, since the force in the feed rod/wedge is unknown, the elasticity of those elements as well as the elasticity of the entire system introduces an error when inferring bore size from encoder position.

In all types of honing feed systems it is desirable that the feed position (i.e. position of the abrasive stones) be known during the honing process. If the honing system does not include some in-process bore measuring means, then knowing the feed position accurately is essential for determining when the desired final bore size has been reached. Most honing machines use some type of encoder or other position transducer on the feed system to infer the feed position.

For each honing application, optimum performance (as determined by bore quality and cost per bore) will require the honing tool to operate within some limits of feed force and feed rate. Furthermore it is possible that the optimum values of those parameters may be different at different stages in the honing cycle. It is not possible to exactly control both feed force and feed rate. The many variables affecting honing performance will cause one of these two parameters to vary any time the other is controlled exactly. However, there are significant advantages to a feed system that constantly monitors the uncontrolled parameter and then uses that information to adjust the controlled parameter, to change the method of control, or to more accurately determine the position of the abrasive stones.

Some hybrid systems already exist, but they fall short of the full control of the proposed invention as described below:

Reference in this regard, U.S. Pat. No. 3,849,940 (Yoshino et al., Honing Machine) which describes a feed system that contains both a constant force and a constant rate system mechanically coupled in such a way that the faster of the two systems will control the expansion of the honing stones. However, if the constant rate system is in control, then there is no means to measure feed force or to correct bore errors caused by variances in feed force. Also, it is not possible to select the slower system when it is desirable to do so, e.g. to improve bore geometry at the end of the honing cycle.

U.S. Pat. No. 4,187,644 (Fitzpatrick, Dual Feed Apparatus for Multiple Spindle Honing Machine) describes a feed system where a cylinder (constant force system) expands stones to the point where they contact the workpiece bore and then the feed control switches to a constant rate mechanism. However, this system includes no means to measure feed force or to correct bore errors caused by variances in feed force. Also, it is not possible to select the controlled force system other than for the initial rapid expansion of the stones.

U.S. Pat. No. 4,397,658 (Vanderwal, Feed Control For Honing or Like Machines) describes an oil damper device to provide a slower initial feed rate or even a constant feed rate for the entire honing cycle. However, this includes no means to measure feed force or to correct bore errors caused by variances in feed force.

U.S. Pat. No. 4,679,357 (Richter et al., Method and Apparatus for Displacing a Honing Tool) describes a feed system where a low value torque limit is imposed on a feed motor control so that stones may feed initially very fast up to the point of contact with the bore, and thereafter a higher torque limit is allowed for honing. The torque limit of the motor is roughly equivalent to a limit on feed force, although mechanical inefficiencies limit the accuracy of using of torque limits as feed force limits. This system also does not include a means to measure feed force or to correct bore errors caused by variances in feed force. There also appears to be no means to control the honing feed to a desired feed force apart from merely preventing the force from exceeding some limit.

European Pat. No. 0081383 (Fox, Improvements Related to Honing) claims a control system that uses feedback from a means for monitoring feed position and velocity and a means for monitoring feed force. However, the details of the patent describe only a hydraulic feed system with a position encoder. In such a system, feed force is inferred by measurement of hydraulic pressure and subject to errors such as that induced from frictional forces between the hydraulic piston and its bore. Although the patent refers to means for monitoring force and position, the use of an electronic load cell to directly measure feed force is not mentioned.

European Pat. No. EP 0 575 675 B1 (Grimm, et al, Method and Machine for Finishing a Bore in a Work Piece) uses a feed force measuring device but only for the purpose of determining the target end point (final encoder position) for the honing process by expanding the honing tool into a size-calibrated ring with a feed force equivalent to that measured on the previously finished workpiece. In a limited way this compensates for errors caused by the elasticity of the workpiece and the feed system components, but as the compensation is a static correction based on force measurements in the previous workpiece, it describes no means to dynamically correct for variations encountered with the workpiece currently being honed. It relies on the assumption that every workpiece is virtually identical to the previous workpiece in regards to hardness and the amount of material to be removed. However, in most applications, this assumption cannot be made reliably. Also, this method makes no suggestion that honing feed force can be controlled throughout the honing cycle.

In all of the above-referenced prior art patents there appears to be no method to dynamically correct in real time for errors in bore size inference that arise due to variations in the feed force. Also, none of the referenced prior art patents gives the honing machine user the ability to choose between rate controlled mode and force controlled mode or to program a honing cycle to switch between the two modes in a manner that could optimize performance.

Accordingly, what is sought is a feed system for a honing machine which provides a capability to dynamically correct in real time errors in bore size inferred arising from variations in feed force, provides a user the ability to choose between rate and force controlled honing modes, and which overcomes one or more of the disadvantages and shortcomings of the prior art systems set forth above.

SUMMARY OF THE INVENTION

What is disclosed is a feed system for a honing machine which provides a capability to dynamically correct in real time errors in bore size inferred arising from variations in feed force, and a method of operation of the same, which allows a user to select between rate and force controlled honing modes, which provides one or more of the advantages of both types of feed systems discussed above, and which overcomes one or more of the disadvantages and shortcomings of the systems set forth above. Such a feed system is anticipated to have wide application for many types of honing tools and improve productivity of many honing applications. The system also provides capabilities for automatic rapid automatic bore wall detection, compensation for elasticity of elements of the feed system and honing tool, and automatic tool protection.

According to a preferred aspect of the invention, a basic system would include a feed rod or other feed element that is pushed (or pulled) by a lead screw or ball screw driven by a feed motor or other driver, with a device for determining a position of the feed element, such as an encoder. A gear reducer, or other mechanism and/or control, may be coupled with the motor or other driver to achieve the torque, speed, and position resolution required by the system specifications.

At the interface or joint between the feed rod and the screw (or nut) would be a load cell or some other means to directly measure the feed rod force. The motor could be controlled by feed rate or the motor could be controlled using feedback from the load cell to hold a constant feed force during honing. More sophisticated computer control could have the feed system following a programmed profile of feed rates, feed forces or a combination of both.

In the feed rate control mode of the invention, the system is automatically operable to keep the feed motor moving at a constant rate or controlling the rate to some programmed profile that is a function of feed position. In the force control mode, the system automatically keeps the feed motor moving in a manner such that the feed force is held constant or follows some programmed profile that is a function of feed position. The profiles could alternatively be determined as a function of another parameter, such as spindle load.

The system of the invention also allows for these two basic modes to be mixed within a honing cycle, e.g. honing at a controlled rate until some condition is met then honing at controlled force until the bore is at final size. Furthermore the system allows for a high degree of flexibility in feed control programming. Parameters such as feed rate, feed force, spindle torque or load, time, number of reciprocation strokes, workpiece temperature, and others can be used in real-time control logic that adapts the controlled feed parameter or even changes the feed control method in a simple or complex programmed manner.

Examples of typical application situations that can be resolved by the system of the invention include workpieces that are very rough or out-of-round from the previous process. To resolve this problem, the system can automatically set an initial honing rate which is very slow to make initial bore contact as gentle as possible. When the bore has been improved sufficiently that the danger of faster honing is past, as automatically determined either by a slowing of feed rate or the passage of a certain amount of time, then the machine control can automatically increase feed rate or switch to a force controlled feed mode.

Another problem that can be resolved or avoided is distortion of workpieces that have non-uniform cross sections. The system can automatically operate to initially remove material at a relatively high feed force or rate, and then, at some predetermined distance before reaching final size, the force or rate can be automatically lowered to a value that relaxes the workpiece distortion and allows for improved bore cylindricity.

The feed rate or feed force can also be automatically reduced to a very low value at the end of the cycle for just a brief period of time or just a few strokes to improve the resulting surface finish beyond the normal range of the abrasive grit size being used.

Also, the system can automatically adapt responsive to changes in the condition of the honing elements such as when the honing stones become glazed. By automatically monitoring cycle time or feed rate, this condition can be detected and the system can make the decision to increase or decrease feed force until the undesirable condition has been corrected.

The system can also automatically detect when one or more abrasive stones have completely worn, by either an unusual increase in feed force or a by an excessively long cycle time.

Still further, the automatic elasticity compensation capability of the system is useful when a substantially constant feed rate is desired, to detect and automatically compensate for deflections in the feed system which produce variations in true feed rate at the abrasive stones. A value for elasticity of the system can be determined at any time during the honing process, to allow for compensation for gradual changes in elements of the system.

DETAILED DESCRIPTION OF THE INVENTION

Figure 1:
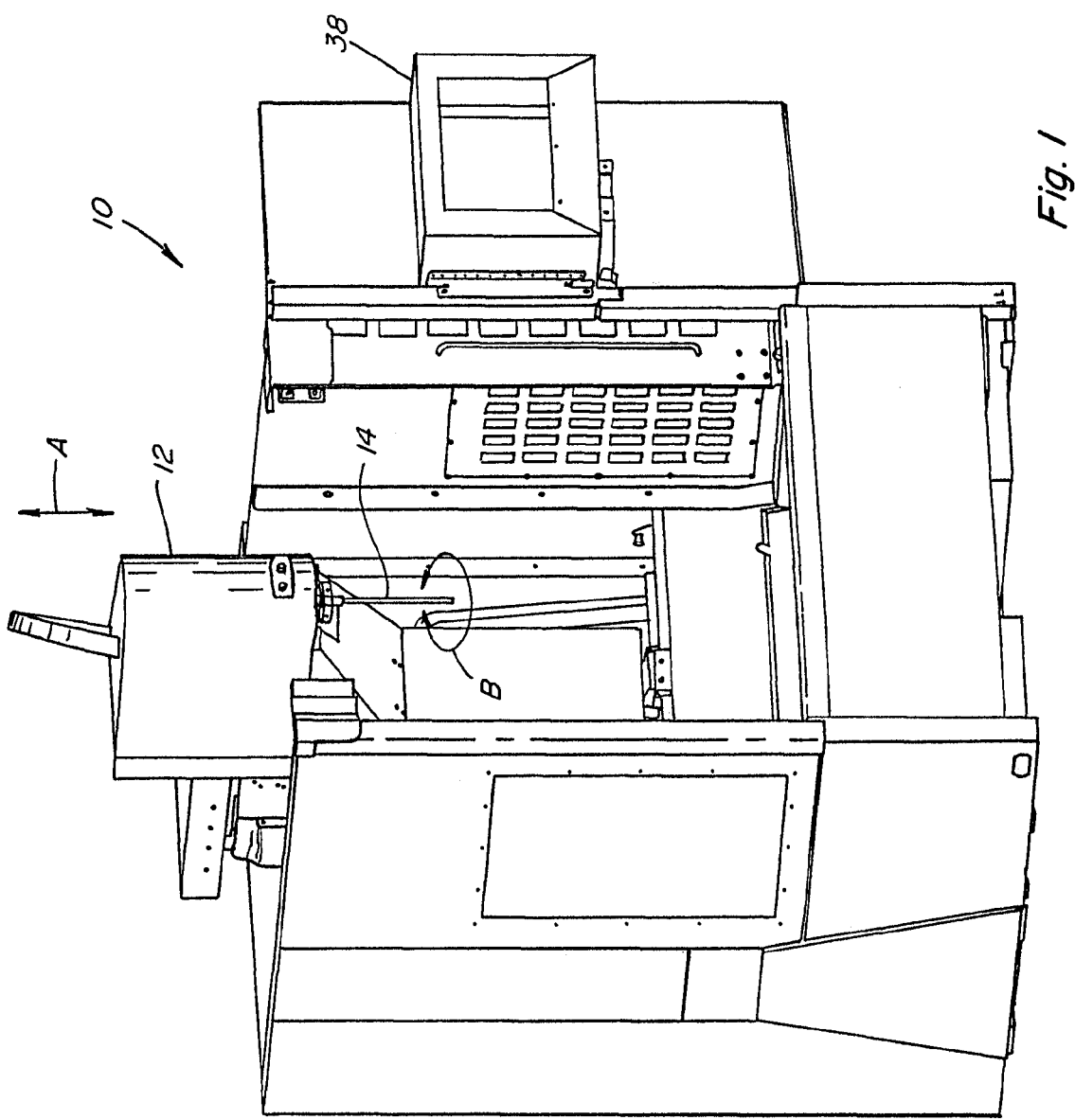
FIG. 1 is a simplified perspective view of a honing machine including a feed system according to the invention.

Referring now to the drawings wherein a preferred embodiment of a feed system and method of operation thereof is shown, in FIG. 1, a representative computer controlled honing machine 10 is shown including aspects of the feed system according to the present invention. Honing machine 10 generally includes a spindle carriage 12 which is movable in a reciprocating stroking action, denoted by arrow A, by a linear motion system such as a conventional motor driven cam linkage mechanism, or a ball screw, roller screw, linear servomotor, rack and pinion, hydraulic cylinder, chain, or belt, under control of a process based main controller 38. Here, carriage 12 is shown supported for reciprocal stroking action in a vertical direction, but it should be understood that stroking in other directions is also contemplated under the present invention. Spindle carriage 12 includes a honing tool 14, which can be of conventional or new construction and operation, generally including an elongate mandrel carrying one or more honing elements such as abrasive stones or sticks which can be moved radially outwardly and inwardly relative to the mandrel, and which abrade and hone a surface of a work piece in which tool 14 is inserted, as tool 14 is rotated, as denoted by arrow B. In a typical application, as spindle carriage 12 is reciprocally stroked upwardly and downwardly, as denoted by arrow A, honing tool 14 will rotate in one direction or the other, as denoted by arrow B, within a hole or bore in a workpiece, for providing a desired size, surface finish and/or shape to one or more surfaces defining the bore or hole.

Figure 2:
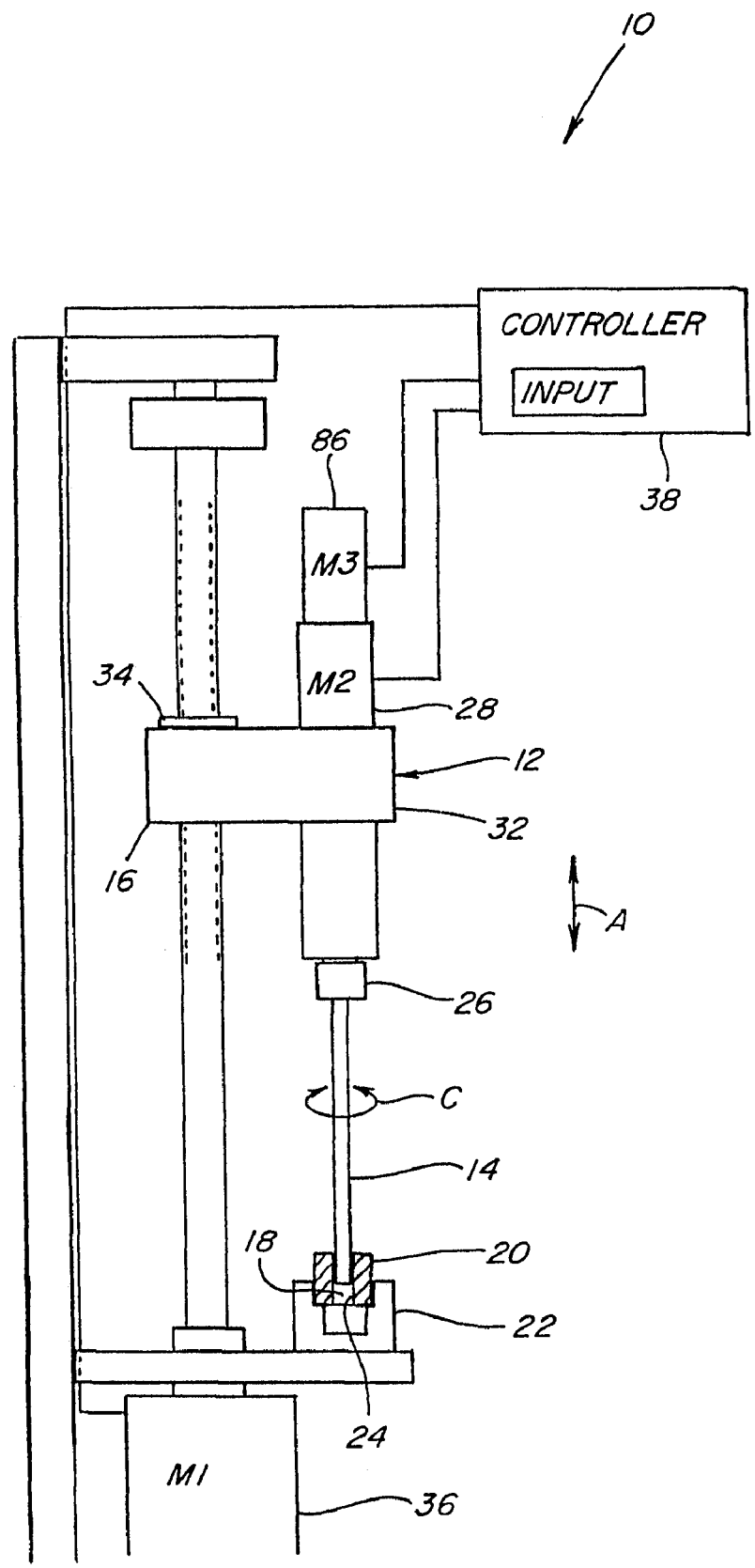
FIG. 2 is a simplified schematic representation of elements of the honing machine of FIG. 1.

Referring also to FIG. 2, a simplified schematic representation of one possible stroking apparatus of honing machine 10 is shown. Here, tool 14 is shown inserted into a bore 18 of a workpiece 20 held in a fixture 22 of machine 10, for honing an internal surface 24 of workpiece 20 defining bore 18. Honing tool 14 is supported by a rotatable spindle 26 for rotation denoted by arrow C, and reciprocal movement denoted by arrow A as effected by a ball screw drive mechanism 16, for effecting desired honing of surface 24 of workpiece 20. Spindle 26 is rotatably driven by a drive 28 in the well known manner. Honing tool 14 is radially expanded and retracted by a feed drive 86, under control of a feed system 30 of the invention, as will be explained below. Spindle 26 supporting tool 14, as well as drive 28 and elements of drive 86, are supported on a spindle support 32 connected to a ball nut 34 of ball screw 16, so as to be movable longitudinally along ball screw 16 as effected by rotation of a servo motor 36 in connection therewith. Ball screw 16 is precisely rotatable by servo motor 36, the number of rotations of and the rotational position of which being precisely detectable by an encoder or other sensor (not shown). Ball nut 34 is moved longitudinally along ball screw 16 by the rotation thereof, and from the rotation count of ball screw 16 the longitudinal position of ball nut 34 is determined. Servo motor 36 is controllable by a processor based main controller 38 for stroking spindle carriage 12 and honing tool 14, as desired or required for achieving a desired parameter or parameters. Here, it should be noted that it is further envisioned that ball screw 16 could be substituted with any other means of rotary to linear motion conversion (e.g. rack & pinion), or that the motor, encoder and ball screw together could be substituted with a linear motor and linear encoder, or any other system of providing position controlled linear motion.

Figure 3:
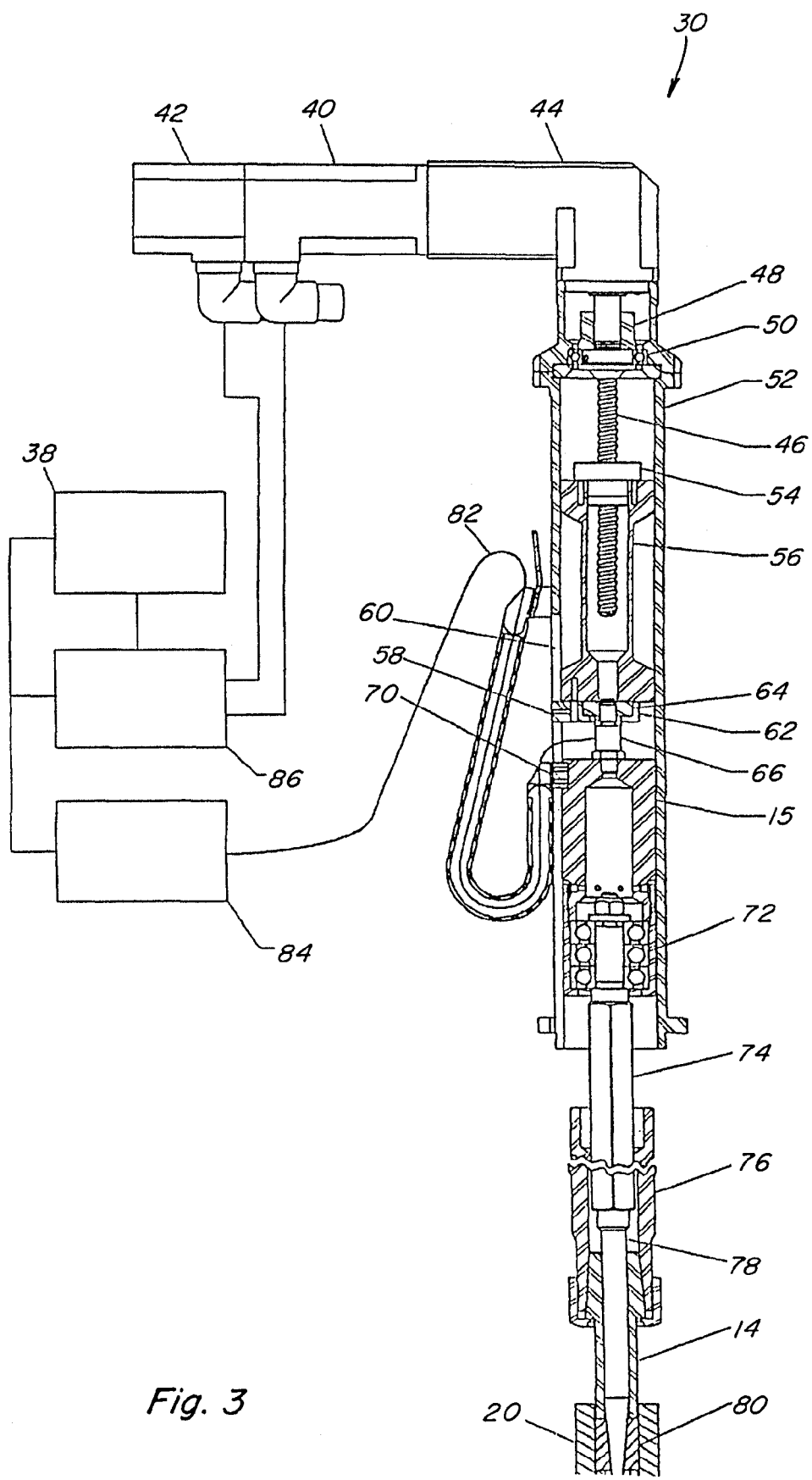
FIG. 3 is a simplified schematic representation of elements of the feed system of the invention.

Turning to feed system 30 of the invention, in FIG. 3, one possible embodiment of a feed drive 86 is shown. A feed motor 40 of drive 86 is connected to (or is integral with) an encoder 42. If needed to provide the desired characteristics of output torque, output speed, and linear travel per encoder count, a gear reducer 44 may be attached to the shaft of the feed motor 40. The gear reducer output shaft is connected to a ball screw assembly 46 by a coupling 48. The ball screw assembly 46 resists axial motion by means of ball bearing 50 held in a feed system housing 52. (The feed system housing 52 may consist of several pieces as required for ease of manufacturing and assembly.) The ball screw engages a ball nut 54 that is attached to a ball nut carrier 56. The ball nut carrier 56 is prevented from rotating by a key 58 that engages a slot 60 in the feed system housing 52. Rotation of the feed motor 40 and subsequently the output shaft of the gear reducer 44 causes the ball screw to rotate, which in turn imparts a linear motion to the ball nut 54 and its carrier 56. The key 58, in this embodiment, is integral with a retainer 62 that has a pocket to hold a round disc 64. The round disc 64 is attached to one threaded end of a load cell 66. The pocket has a very small amount of clearance with the round disc 64 for the purpose of allowing the round disc 64 to align itself with the components below without creating any undesirable stresses on the load cell 66. The load cell 66 is fastened to a non-rotating feed rod 68, which is prevented from rotating by a key 70 which also engages the previously mentioned slot 60 in the feed system housing 52. The non-rotating feed rod 68 is attached to a tube holding an arrangement of angular contact bearings 72. The rotating races of the bearings 72 are attached to a rotating feed rod 74. The rotating feed rod 74 is splined or keyed by some means so that it will rotate with the honing machine spindle shaft 76 and yet allows relative axial motion between the spindle shaft 76 and the feed rod 74. The spindle shaft 76 holds the honing tool 14 which contains a wedge 78 for expanding abrasive honing elements 80 into the bore of the workpiece 20. The wedge 78 is attached to the feed rod 74 and is allowed to move axially with the feed rod 74 while the tool 14 is restrained from axial movement by its connection to the spindle shaft 76. This relative axial motion of wedge 78 and tool 14 creates the expanding/retracting motion of the abrasive honing elements 80. The feed system housing 52 and the spindle shaft 76 are both connected to carriage 12 (FIGS. 1 and 2) that strokes them together to generate the axial reciprocation of the honing process.

The axial force of the wedge 78 to expand the honing elements 80 is developed from the torque of the feed motor 40 and converted to a linear force by the ball screw and nut and then transmitted through the load cell 66 to the feed rod 74 and wedge 78. The load cell 66 therefore always senses the full axial feed force of the honing process. The load cell cable 82 is carried through a cable carrier to an amplifier 84 (if required). Power to and signals from the load cell 66 run through this cable 82 and amplifier 84 to a processor based feed control 146 and a servo controller 148 of feed drive 86, in connection with motor 40 and encoder 42 of drive 86. The control of these devices as described in the methods below result in signals that precisely control the motion of the feed motor 40.

There are two basic methods of feed control. The first is feed rate control, where the control system keeps the feed motor 40 moving at a constant rate or controlling the rate to some programmed profile that is at least partially a function of feed position. The second basic method of feed control is force control, where the control system keeps the feed motor 40 moving in a manner such that the feed force is held constant or follows some programmed profile that is at least partially a function of feed position.

Computer control also allows for these two basic methods to be mixed within a honing cycle, e.g. honing at a controlled rate until some condition is met then honing at controlled force until the bore is at final size. Furthermore the computer control allows for a high degree of flexibility in feed control programming. Parameters such as feed rate, feed force, spindle torque, time, number of reciprocation strokes, workpiece temperature, and others can be used in real-time control logic that adapts the controlled feed parameter or even changes the feed control method in a simple or complex programmed manner. The following examples are typical application situations that can be resolved by programming in this manner.

Workpieces that are very rough or out-of-round from the previous process can create dangerous impacts when honing feed is controlled by force or even when the honing rate is set too high. An initial honing rate can be set very slow to make initial bore contact as gentle as possible. When the bore cleans up sufficiently that the danger of faster honing is past, as determined either by a slowing of feed rate or the passage of a certain amount of time, then the machine control can increase feed rate or switch to a force controlled feed mode.

Workpieces that have non-uniform cross sections tend to distort under high feed forces. Most of the material could be removed at a relatively high feed force or rate and then at some predetermined distance before reaching final size the force or rate can be lowered to a value that relaxes the workpiece distortion and allows for improved bore cylindricity.

The feed rate or feed force can be reduced to a very low value at the end of the cycle for just a brief period of time or just a few strokes to improve the resulting surface finish beyond the normal range of the abrasive grit size being used. This sometimes allows for using coarser grit for faster stock removal and yet still achieve surface finish requirements.

During the honing process the surface of the abrasive stones can change in condition ranging from open and free cutting to glazed. By monitoring cycle time or feed rate, this condition can be detected and the control system can make the decision to increase or decrease feed force until the undesirable condition has been corrected.

When one or more abrasive stones have completely worn, this system can detect that condition by either an unusual increase in feed force or a by an excessively long cycle time.

If a truly constant feed rate is desired, the control system can compensation for deflections in the feed system which produce variations in true feed rate at the abrasive stones. (See Elasticity Compensation below.)

In certain applications it may be advantageous to maintain a constant or profiled level of spindle torque. This can be accomplished through feedback from the spindle drive to control the motion of the feed motor. In such an application the feed force is not controlled and may vary. The present invention will compensate for bore size errors due to system elasticity.

As with other existing honing control systems, this system may include such features as automatic stone wear compensation, manual bore size adjustment and/or integration with an in-process or post process gage to compensate for abrasive wear and to improve bore cylindricity.

In addition to these and many other useful control schemes, the continual real-time computer monitoring and control of feed force and feed position, integrated with the honing machine control allows for three new performance enhancing features: automatic bore wall detection, elasticity compensation and automatic tool protection.

Automatic Bore Wall Detection.

Prior to the beginning of the honing cycle the honing tool has been retracted to a size that allows for easy entry into the bore. If the honing cycle then starts with the feed motor moving at the honing feed rate it can take several seconds of "cutting air" before the abrasive actually begins to contact the bore wall or surface. To minimize this, often the tool is rapidly expanded to a size just smaller than the smallest expected workpiece bore before slowing down to the honing rate. However, pre-process bores typically vary considerably in size and those that are larger than the smallest expected bore will still have wasted time as the honing tool moves slowly from that position to the point of contact. Also, if a pre-process bore is smaller than the smallest expected bore, then the stone will be fed into the bore wall at a high rate of speed. The impact could damage either the tool or the abrasive or the workpiece fixture.

Controlling the honing to a feed force can eliminate the wasted time, but if the retracted tool diameter is too much smaller than the bore size the feed system may have too much distance to accelerate the stones under no load and when they reach the bore wall they have sufficient velocity to create an impact. Again, the impact could damage either the tool or the abrasive or the workpiece fixture.

The high speed impact of the stones with the bore wall is potentially damaging because the spindle is turning and the stones will immediately grip the workpiece on contact. If the spindle is not turning, then honing machines with no feed force measuring device have no way of detecting when the bore wall has been contacted. Therefore, in the past it was a necessity to have the spindle turning when the feed system was in the rapid feeding phase.

With the present invention, however, the spindle can remain off while the feed system moves at a high rate of speed. Contact with the bore wall or surface is seen by an immediate rise in the measured feed force. At that point the feed position is retracted very slightly to just remove the pressure of stones against the bore wall and then the spindle is started and the honing cycle can begin with no time wasted "cutting air". The high speed of the feed motor and the fast response of the control system allows for this step to happen in a very brief period of time, much less than the time that would have been needed to have the stones safely approach the bore wall. Since the spindle is not turning, the impact can be done at high speed with no danger of damage to tool or workpiece (except possibly when unusually delicate tools are involved).

An ancillary benefit of this method is that the control system is able to determine or identify encoder information representative of the bore size at the moment of impact. If a bore is seen as already larger than the finished hone size then the control system can respond accordingly to alert the operator or automatically remove the defective workpiece from the workflow.

Elasticity Compensation-Measurement and Feedback to Improve Size Control Precision.

If the feed force is not held at a constant value from one cycle to the next, the difference in feed force results in different degrees of deflection of all the feed system components including the tool, wedge, and workpiece. This variance in system compression (or tension for pull-type tools) adds an error to the size control results when the encoder position is used as a means of knowing final bore size. This error is most troublesome to rate controlled process when workpieces have a wide variation in the amount of material that must be removed.

With a load cell used in conjunction with the encoder, this system will have the ability to measure and compensate for the elasticity of the entire system. A value representative of the elasticity of the feed system components can be calculated from encoder and load cell readings taken during an automatic initialization routine (described in detail below).

In the past when setting up a honing machine, the control system was required to be "taught" the location of the feed system (including the tool, wedge, and stones) relative to the bore of the workpiece. This initialization step is has always required the operator to work in conjunction with the machine control and a certain skill or "trained feel" has been required to perform this operation accurately. The operation has been called "size initialization" or "snugging" because the operator moves the feed system by a manual input until he feels the workpiece is snug on the tool. The accuracy of this operation depends on the operator's ability to feel when the workpiece is as snug on the tool as it will be when the finished size is reached in the honing cycle.

With this new feed system it is possible to use a new technique for size initialization that eliminates the effect of operator skill and at the same time gathers data that can be used to make the honing process more precise. The machine control will instruct the operator to move the feed system to a point where the workpiece is almost snug on the tool. Then the operator will press a button to have the machine control start the initialization sequence. The sequence begins by the feed system automatically retracting by an amount sufficient to be assured that the abrasive stones are no longer contacting the bore. Then the feed system will automatically begin to expand at a rate that is similar to the expected rate of honing. After moving a distance sufficient to take up any backlash in the system, the control system will automatically begin storing data points of encoder position and feed force. These points will fall along a curve that has the general shape shown in FIG. 4.

Figure 4:
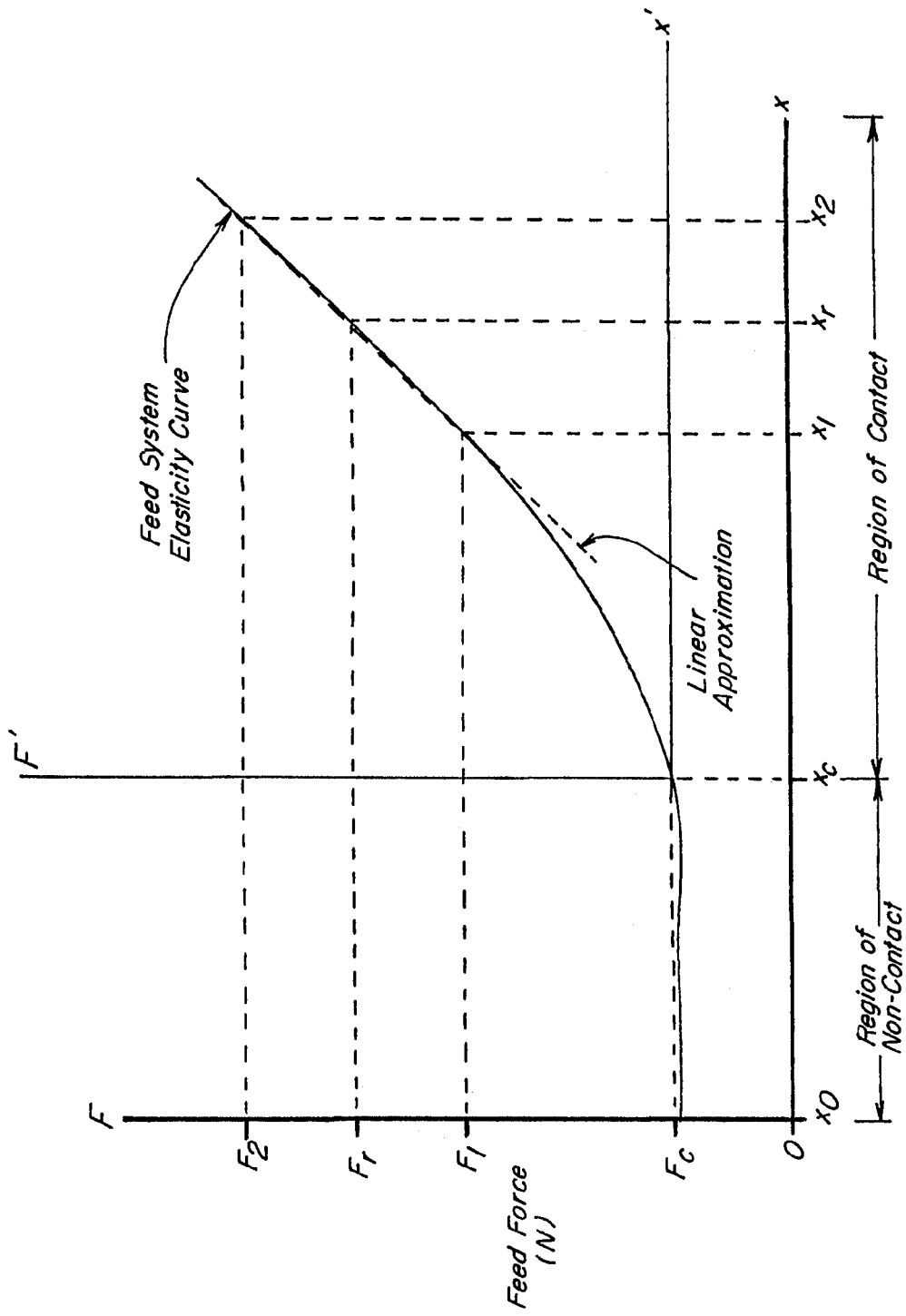
FIG. 4 is a simplified graphical representation of feed force verses encoder position for the feed system of the invention.

Examining FIG. 4, the curve shown can be divided into two regions. The first region, which is substantially flat, is the region of non-contact. In this region the abrasive stones have not yet been expanded to the point where they contact the bore wall. The force level measured in this region represents a baseline value of force. This baseline value is a composite of several things. First, due to friction there will always be some drag on the feed system as it moves. Second, if the system is vertical, the weight of the feed system components will place a static load on the measuring device. Lastly, the measuring device itself may produce some non-zero value at no load due to minor inaccuracies in mounting or due to variations in electronic characteristics of the measuring device. This baseline force level is recorded so that it may be subtracted from the force values in the second region of the curve to determine the true force values as a function of encoder position.

In the second region of the curve the abrasive stones have made contact with the bore wall and the feed force rises as the feed motor continues to advance. This is the region of elastic contact. The curve is not perfectly linear in this range as elastic theory might suggest. This is due to the fact that some components are in contact and the area of their contact regions is increasing with load (e.g. the balls and races in the thrust bearings, and the imperfect abrasive stones against the imperfect bore wall).

The control system must decide when the feed system has reached the region of contact. Due to some level of noise in the measurements, it is convenient to define the beginning of the contact region as the point where the force rises to some small but significant level over the baseline force. In the figure, this level of force is termed $F_c$ and the corresponding encoder position $x_c$. For convenience this point is taken as the origin of a new set of coordinates labeled X' and F' where $$x'=x-x_c$$

and $$F'=F-F_c$$

Although the graph is drawn with the encoder position as the independent variable, it will be more useful for control purposes to say that the relative encoder position is a function of feed force:

$$X'=f(F')$$

Or perhaps a more appropriate way to describe this is that once the abrasive stones are making contact with the bore wall, the additional distance the encoder can be moved is a function of the force required to compress (or extend) the feed system components to reach that position.

An approximate mathematical expression for this function can be determined by using the data points with any number of curve fitting techniques. The resulting function may be linear, non-linear or piece-wise linear. The simplest technique is to assume linearity and use two points to determine the line. This technique may often be sufficient since the feed force during the honing cycle is usually with a small range. If the operating range of force is known or can be estimated from experience, then two points can be used at or near the ends of that range. On the graph, these points are shown as $(x_1, F_1)$ and $(x_2, F_2)$. In that case, the slope of the line is given by $$k=(F_2-F_1)/(x_2-x_1)$$

where k is a spring constant in the classical sense quantifying the elasticity of the system.

Once expressed mathematically, the control system will be able to use this function to automatically make bore size corrections to the encoder inferred bore size, based on the measured feed force in real time at any point in the honing cycle. To do this, since both the force value from the load cell and the encoder reading are relative values, it will be necessary to have some point of reference. This point of reference can be any point on the contact region of the curve. On the graph it is shown as the point $(x_r, F_r)$. Then in general the function describing the curve can be expressed as $$x-x_r=f(F-F_r)$$

If linearity is assumed this becomes $$x - x_r = (F - F_r)/k$$

The control system can then use this function during honing to more accurately know bore diameter at any point in time by this formula:

$$D = D_i + [x - x_r - f(F - F_r)] LR_t / NR_g$$

If linearity is assumed this becomes $$D = D_i + [x - x_r - (F - F_r)/k] LR_t / NR_g$$

Where D=current bore diameter (mm)
$D_i$=the bore diameter of the initialization workpiece (mm)
x=the current encoder position (counts)
$x_r$=the reference encoder position (counts)
F=the current feed force measurement (N)
$F_r$=the reference feed force measurement (N)
$f(F-F_r)$=the encoder correction function, as described above (counts)
k=a linear encoder correction constant, as described above (N/count)
L=lead of the ball screw (mm/ball screw rev)
N=encoder size (counts/motor rev)
$R_g$=gear ratio (motor rev/ball screw rev)
$R_t$=tool ratio (diameter movement/axial movement) where:
$R_t$=tan θ for single stone tools
$R_t$=2 tan θ for multi stone or sleeve tools
θ=wedge angle In controlling the honing cycle, rather than knowing the current bore diameter, it may be more important to identify a target encoder position (e.g. a position corresponding to final diameter or to the diameter at the end of a certain honing stage). Since this target encoder position will change as feed force changes, the formulae above can be rewritten to give the desired target encoder position as follows:

$$x_t = (D_t - D_i) NR_g / LR_t + x_r + f(F - F_r)$$

If linearity is assumed $$x_t = (D_t - D_i) NR_g / LR_t + x_r + (F - F_r)/k$$

where $x_t$=target (or final) encoder position (counts)
$D_t$=target (or final) diameter (mm)

The feed force level F, in general will not be the absolute measurement from the force measuring device. As mentioned previously, there exists some baseline or background level of force due to frictional drag, the weight of the feed system components and possibly from errors induced in the measuring device due to imperfect alignment in mounting. These values tend to be relatively static, changing only slowly over time, if at all. The force used in controlling the feed system as described above must be the differential amount of force, therefore it is important to quantify this baseline level of force so that it may be subtracted from the raw force measurement. One technique for measuring the baseline level of the force signal is to take a reading immediately at the beginning of the cycle when the stones are known to not be yet contacting the bore wall. This can be done on every cycle and thereby continually compensate for any changes in the baseline signal level. If the Bore Wall Detection routine described above is being employed, this same technique can be used providing that the feed system has retracted at least enough to allow the time for reading the baseline signal before the stones contact the bore wall.

Using Tools that Require Significant Feed Force to Expand.

For simplicity in the descriptions above and in FIG. 4, it has been assumed that baseline level of force is some relatively small constant value. However some honing tools require some non-zero and possible increasing force just to expand the abrasive portion of the tool (e.g. abrasive plated sleeve-type tools). In this case the baseline is not a simple constant value, but rather it is a curve of force versus encoder position. With such tools a slight variation must be made to the automatic rapid bore wall finding and the elasticity compensation techniques described above. An added step is required at the beginning of these techniques.

This first step will consist of moving the feed system through the expected range of motion at approximately the expected speed with the tool completely out of any workpiece bore. During this time the control system reads force and encoder position to generate a baseline curve. This curve then represents the amount of force at the given encoder position that must be subtracted from the total forces that are measured during the rapid bore wall finding or the elasticity measurement routines. After subtracting the baseline curve from the total measured curve, the resultant curve will be identical in form to the curve shown in FIG. 4 and the mathematical treatment of this rectified data can proceed exactly as previously described.

If this baseline force curve is expected to vary slightly over time due to bore size compensations or environmental factors, the baseline can be remeasured at any desired frequency.

Automatic Tool Protection.

At the initial start, or even during the honing operation, there is a potential for damaging the tool, and possibly the workpiece fixture, when the feed system is expanding the honing element at a high rate. Because the spindle is turning at the time that the honing element is being fed it is possible that the abrasives of the honing element will immediately grip the workpiece on contact causing the tool to twist. This potential for damaging the tool also exists at setup during the "size initialization" or "snugging" operation. This action requires a skilled operator to manually expand the honing element against the surface of the bore of the workpiece to determine a reference for the bore diameter. It is possible that during this process the operator could damage the tool by over expanding and crushing the abrasives of the honing element against the surface of the bore.

Figure 7:
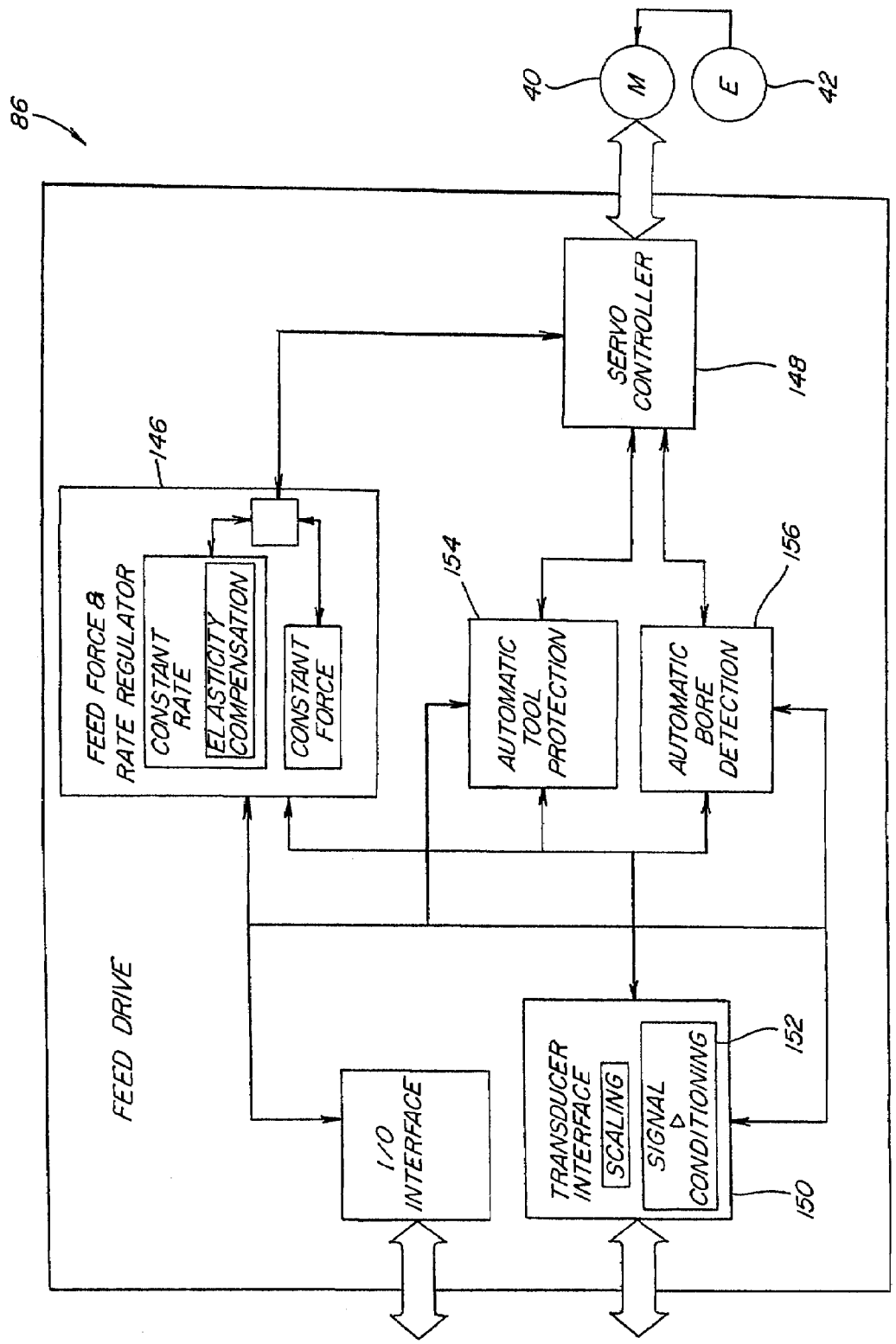
FIG. 7 is a simplified schematic representation of a feed drive for the system of the invention.

Referring also to FIG. 7, with the present invention, feed drive 86 includes a system that can detect an abnormally high force yet is sensitive enough to react at once to protect the tool and workpiece fixture from damage. The feed system takes advantage of the load cell to monitor the force during feed expansion and immediately retracts the honing element when the feed force exceeds a predetermined stored limit. The new feed system monitors and automatically controls servo controller 148 thereof to retract the honing element with minimal delay to eliminate the possibility of the tool seizing the workpiece.

The feed system control automatically prevents the operator from manually expanding the tool any further if this feed force overload, or fault, condition existed during "size initialization". In addition to automatically retracting the honing element, the new feed system can also independently notify the main controller 38 of the fault condition through an I/O interface. The warning is given whether the fault took place during the "size initialization" or during a normal honing operation. This notification in turn would allow main controller 38 to halt other operations and inform the operator of the fault condition.

Feed System Control.

A typical main control system of a honing machine, such as controller 38 of machine 10, typically has to share its processing power among the various tasks that it is to perform. The performance features described above would require the control system to run at very high speeds to insure the sensitivity and response time required from them. This would likely mean that the controller would have to process all the data in real time to minimize delays and react immediately to changes in the feed force. Besides monitoring the feed system, the processor would also have to split its processing time among the other tasks that it performs. However, a more direct method of control is available if the task of processing the feed system is given to the feed drive unit. To obtain this prerequisite, linearity would have to be assumed and the unit would have to be capable of using an external signal as feedback.

The present invention utilizes such a control system. According to this embodiment of the invention, tasks pertaining to the expansion and retraction of the honing element are performed by feed drive 86, along with monitoring and reacting to any stimuli, such as from the load cell. This method of controlling the feed system directly by means of the feed drive 86 eliminates possible processing overloads in the main controller 38, and provides quick response. It assures the most sensitive means to monitor and respond to changes in the feed force by immediately retracting the honing element with minimal delay when the surface of the bore of a workpiece is found or a force overload condition exists.

Referring also to FIG. 7, the feed system control referred to in this invention manages all inputs and outputs to and from drive 86 along with the load cell circuits. The load circuits consist of a transducer interface circuit 150 and a signal conditioning circuit 152, an automatic tool protection circuit 154, an automatic bore detection circuit 156, and the control 146 managing the feed force and feed rate functions.

One of the unique features of this invention is its ability to control the feed system at such a wide range of feed forces required by different tools, yet be sensitive enough to distinguish small changes in the feed force when determining when the honing element has contacted the bore. This automatic force scaling is accomplished in the transducer interface and signal conditioning circuits 150 and 152, and is based on the expansion and retraction forces required by the specific tool used.

The Automatic Bore Detection (ABD) circuit 156 monitors the feed speed, force, and position while the tool rapidly expands in the workpiece. Upon reaching the surface of the bore the feed position and force are both automatically captured and saved. This is followed by the feed system immediately retracting to release the abrasive pressure off of the workpiece. This triggers the main controller 38 of the honing machine to begin moving the other axes. The actual honing process is then started when the feed force and position that had been saved earlier are used to rapidly feed the honing element out to the bore surface while the tool is spinning and stroking.

The ABD circuit 156 employs a method of detection to compensate for any normal feed force changes in the system that might occur over time. Among these types of changes is the frictional force along the tool's travel that can vary as the abrasives wears over time. The location of the feed system along the tool's total travel is based on what percentage of the tool's total range is used and also on the amount of normal wear of the tool's abrasive during the honing operation. Another factor to consider is the amount of drag due to friction on the feed system as it is moving.

Without compensation these forces can affect when the bore is detected. To compensate for changes like these, the ABD circuit 156 monitors the feed force at the beginning of each cycle as the honing element approaches the workpiece to determine a baseline level of force, and then automatically computes a minimum force that will indicate when the honing element reaches the bore surface. ($F_c$ in FIG. 4.)

As described previously (Elasticity Compensation), the size initialization step becomes an automatic process rather a manual one. This step employs the automatic bore detection feature to eliminate the need for operator feel.

The Feed Force & Rate Regulator of control 146 controls the feed motor 40 based on the mode of the application. The application may require a constant feed force or constant feed rate or any combination of the two during the honing process. Incorporating the feed force and rate regulator in the drive unit allows the switching between the two modes virtually instantaneously and can be done at any time during the honing process.

In the constant force mode the regulator will control the feed motor rate of speed to maintain a specific feed force. A distinct characteristic of this invention is the ability of the regulator circuit to filter out any outside forces that may influence the actual feed force that the system is trying to maintain.

Unlike other systems running at a constant rate, the feed system described in this invention will maintain a specific feed rate independently of the generated feed force while continuously compensating for the elasticity of the entire feed system. In the constant rate mode the automatic elasticity compensator circuit dynamically updates, in real time, the final position of the feed system. The final position update is based on the variance in system compression (or tension for pull-type tools or a combination of tensile load with torsion loading of rotary systems) the feed system experiences while expanding the tool and assures an accurate and repeatable finished size from cycle to cycle.

The Automatic Elasticity Compensator circuit must use some value of system elasticity. This parameter (k) is measured during the size initialization step as described previously.

The Automatic Tool Protection (ATP) circuit continuously monitors the load cell any time the feed system is moving. Whether the operator is manually moving the feed system or the feed system is automatically searching for the bore or the feed is running in either regulation modes, the ATP circuit checks that the feed force stays within a specific range. If the feed force exceeds a predetermined value then the ATP circuit will immediately retract the feed system to release the generated force and notifies the main honing machine controller 38 to halt all other axes.

Honing Optimization.

With this invention all pertinent feed system parameters are either controlled or measured. Since the machine is computer controlled there exists an opportunity to automatically optimize the honing performance for the customer. Bore size control and bore cylindricity can often be satisfactorily achieved over a wide range of feed parameters. However within this range there are trade-offs of cycle time and stone wear. The customer is concerned about these inasmuch as it affects the total cost per bore for the honing operation.

An optimization program included in the computer control of the machine could request some basic information from an operator or other manufacturing personnel regarding cost of abrasive stones, height of abrasive stones, stones per tool, cost per hour of labor and machine, etc. Also input would be some limits to feed force and feed rate. The machine would then run a trial for a predetermined number of workpieces. The machine would record cycle times and cumulative bore size compensations as a measure of stone wear. The machine could then estimate the cost per bore under those set of feed parameters. Then the feed force or feed rate could be varied by some predetermined increment and another trial could be run. In this manner the machine could change one variable (feed force or feed rate) until an optimum cost per bore is found. At that point the trials would conclude and the machine would keep its settings at the optimum values until overridden by an operator. Except for the initial query of pertinent data, all this could proceed without need for operator involvement or awareness.

Machine Setup.

Figure 5:
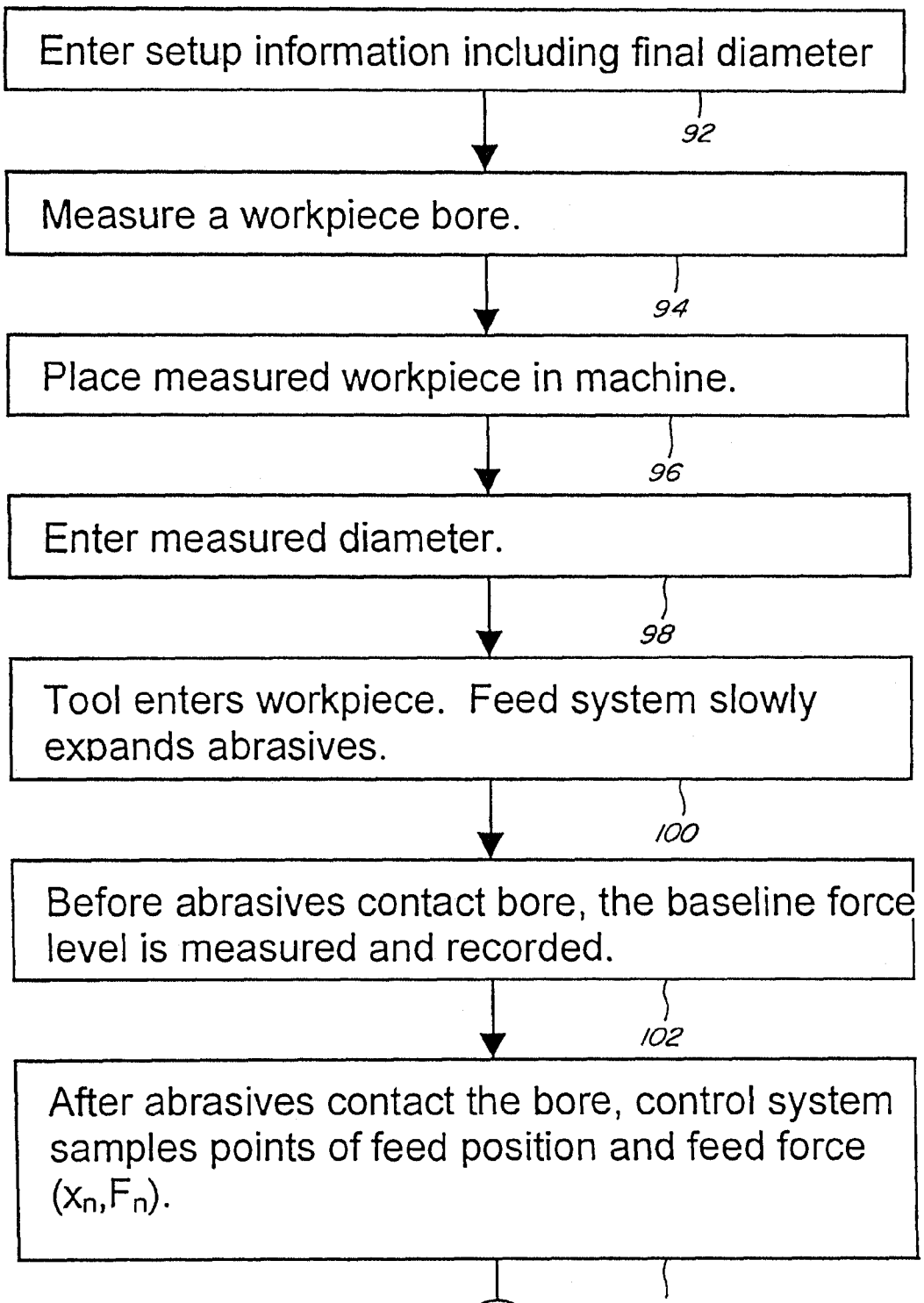
FIG. 5 is a diagrammatic representation showing steps of a method of the invention for machine setup.
Figure 5A:
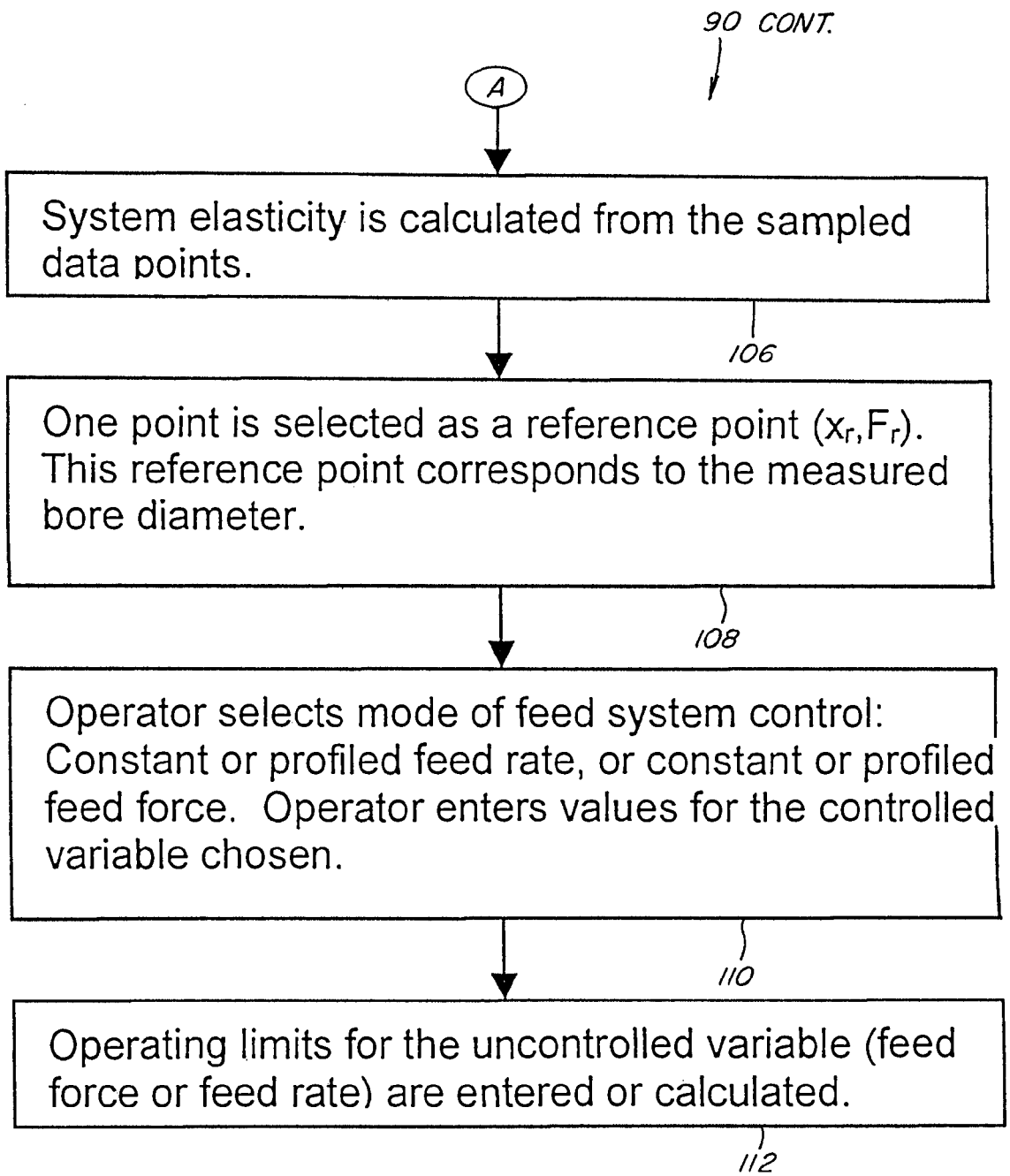
FIG. 5a is a continuation of FIG. 5.

Referring also to FIGS. 5 and 5a, a high level flow diagram 90 of steps of machine setup according to one method of the invention is shown. Here, it should be noted that when a new tool is installed, the control system has no knowledge of the relationship between the feed system encoder position and the diameter of the tool. An initialization step is required, then the following steps are preformed:

1. The operator enters setup information including the target (or final) diameter of the workpieces that will be honed, as set forth in block 92.

2. The operator measures the bore of a workpiece with some measuring device external to the machine, as set forth in block 94.

3. The workpiece is placed in the machine, as set forth in block 96.

4. The operator enters this measured diameter into the computer, as set forth in block 98.

5. When prompted by the operator the machine will bring the tool into the workpiece bore and the feed system will move slowly to expand the abrasive, as set forth in block 100.

6. Before the abrasive contacts the bore the control system will sample the load cell to determine a baseline level of force, as set forth in block 102.

7. When the abrasive contacts the bore the force measured by the load cell will rise. While the force is rising the control system will sample at least two points, as set forth in block 104, a point being a data pair of encoder position and feed force. These points are referred to as $(x_1,F_1)$, $(x_2,F_2)$, etc, and these are used to calculate the system and tool elasticity as detailed in the mathematical description above, as set forth in block 106. The initial point, x1, corresponds to the measured diameter of the bore. The calculated value of elasticity is stored in the computer. (As noted in the mathematical description, could be as simple as a single constant value (k) or it could take the form of a more sophisticated mathematical function.)

8. One of the sampled points is chosen to be a reference point referred to as $(x_r,F_r)$ and this is stored in the computer, as set forth in block 108.

9. The operator selects the method of feed system control: Constant or profiled feed rate, or constant or profiled feed force. The operator enters the values for the controlled variable chosen, as set forth in block 110.

10. The operator may set or the machine may calculate default values for safe limits upper of feed force and feed rate, as set forth in block 112. Lower limits may also be set/calculated as indications of inadequate honing performance.

Machine Operation—Workpiece Honing.

Figure 6:
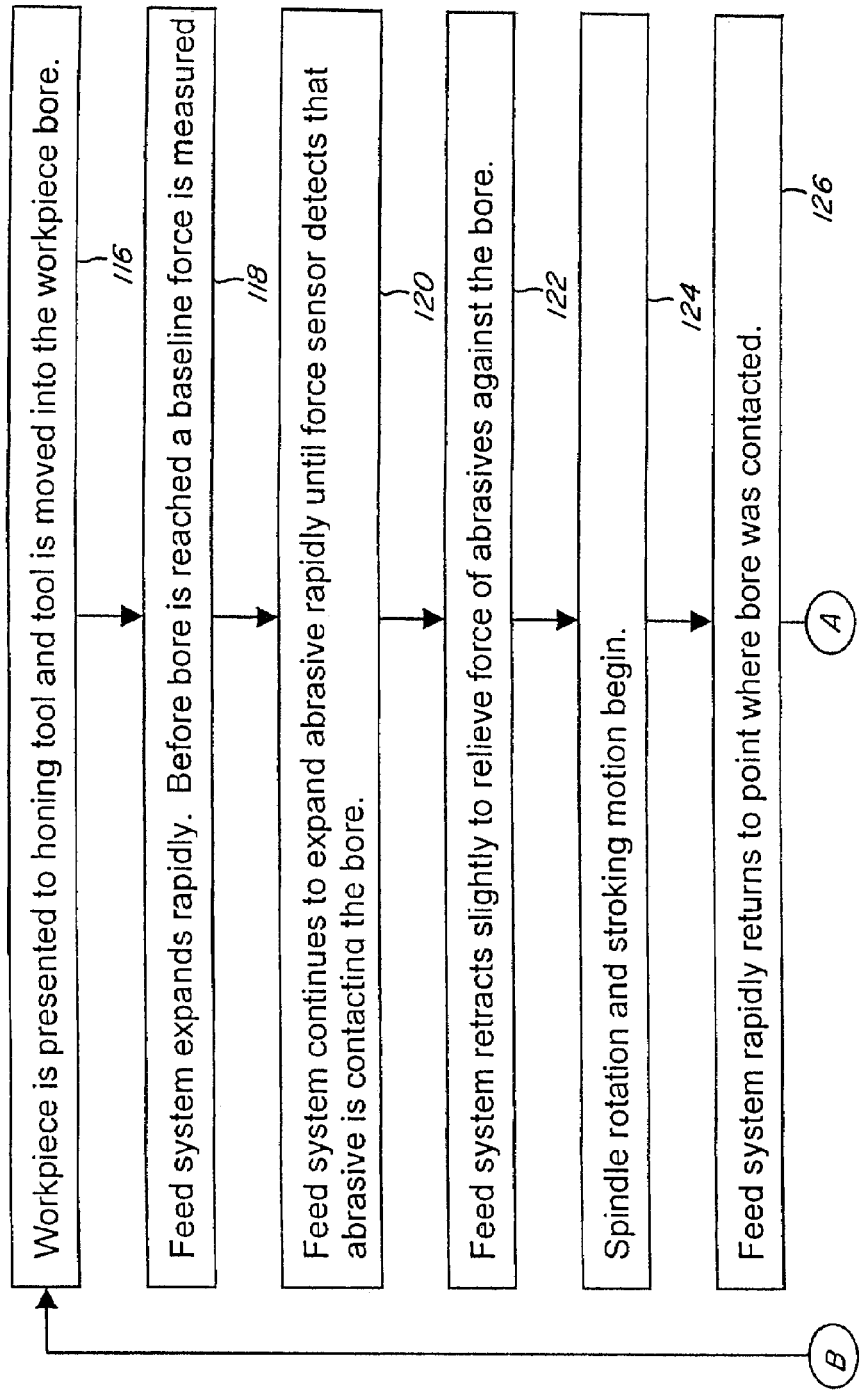
FIG. 6 is a diagrammatic representation showing steps of a method of the invention for machine operation.
Figure 6A:
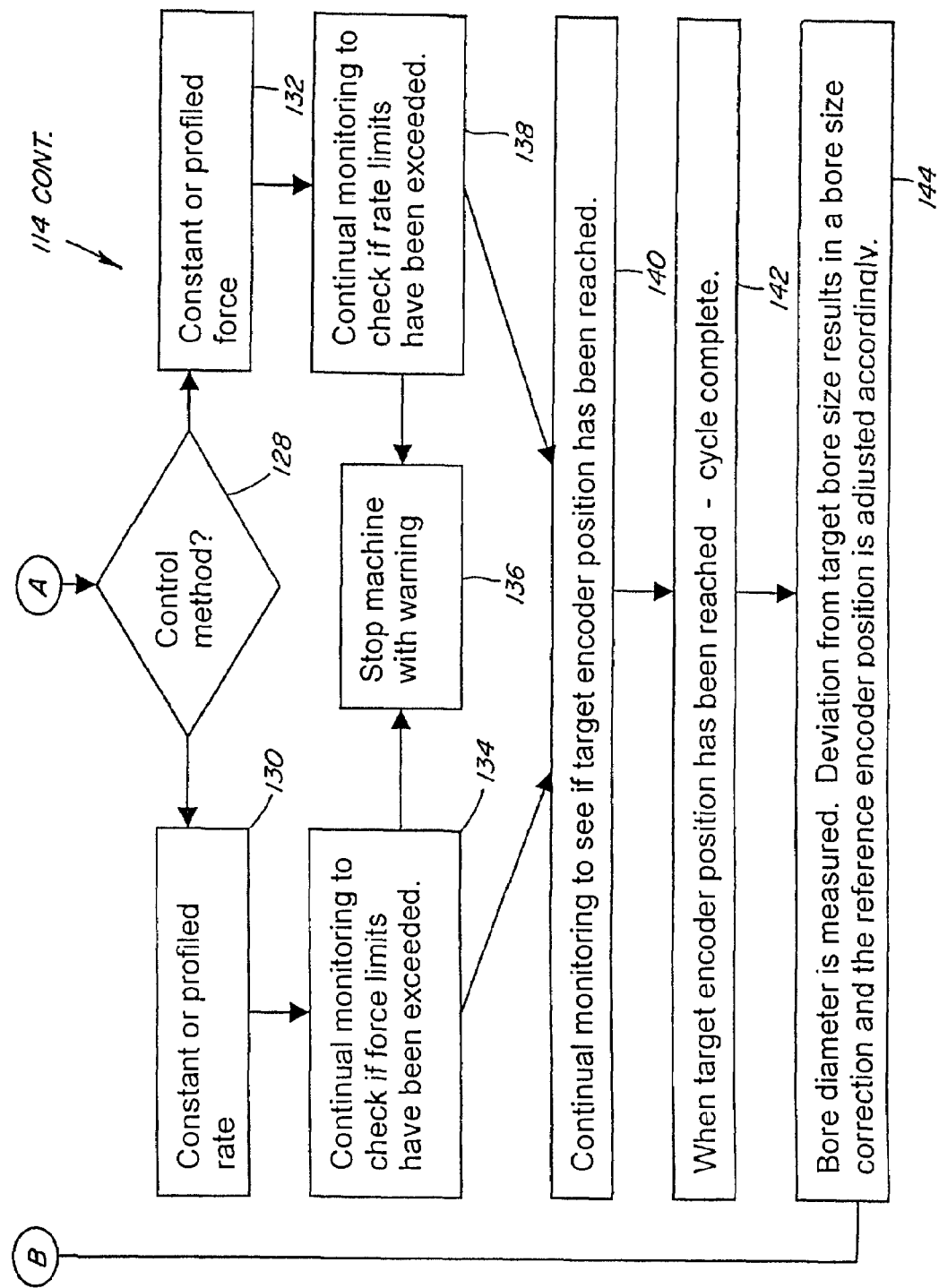
FIG. 6a is a continuation of FIG. 6.

Referring also to FIGS. 6 and 6a, a high level flow diagram 114 including steps of a preferred method of honing a workpiece according to the invention are shown, and are described briefly as follows.

1. The workpiece is presented to the honing tool and the machine moves the honing tool into the bore, as denoted at block 116.

2. The feed system rapidly expands the honing element toward the bore. Immediately, while expanding, and before reaching the bore, the baseline level of force is determined, as denoted at block 118.

3. The feed system continues to expand rapidly until a level of force is sensed that indicates that the abrasive is contacting the bore, as denoted at block 120. During this expansion before the bore is contacted, the feed force is sampled to determine a baseline level of force.

4. The feed system retracts slightly to relieve the force of the abrasive against the bore, as denoted at block 122.

5. The spindle rotation and stroking motion begins, as denoted at block 124.

6. The feed system rapidly returns to the point where it had contacted the bore, as denoted at block 126.

7. The feed system then feeds the abrasive using one of the following methods: constant or profiled feed rate, or constant or profiled feed force, as denoted at decision block 128 and blocks 130 and 132. If the constant or profiled rate mode is selected, the system continually monitors to check if force limits have been exceeded, as denoted at block 134. If so, the system stops the machine and outputs or displays a warning, as denoted at block 136. If the constant or profiled force mode is selected, the system continually monitors to check if rate limits have been exceeded, as denoted at block 138. Again, if so the machine is stopped and a warning is displayed, as denoted at block 136.

8. In either instance, the system continually checks to see if the target encoder position $(x_t)$ has been reached, as denoted at block 140. If constant force is the method chosen then the target encoder position is a static value. If any other method has been chosen, then the target encoder position changes dynamically as the measured force level changes.

9. The system also monitors the uncontrolled variable to be sure the preset limits are not exceeded. If they are, then the machine will stop with a warning displayed.

10. When the target encoder position is reached the honing cycle is complete, as indicated at block 142.

11. The bore is measured (either by the operator or by automated gaging) and if the bore deviates from target diameter then a bore size correction (usually this is for abrasive wear) is fed back to the computer, as denoted at block 144. This correction is used to shift the value of the encoder reference position, $x_r$. The process is then repeated until the target bore size is achieved.

Thus, there has been shown and described a honing feed system having full control of feed, force servo stroking apparatus and system, which overcomes many of the problems set forth above, rate and position, and method of operation of the same. It will be apparent, however, to those familiar in the art, that many changes, variations, modifications, and other uses and applications for the subject system and method are possible. All such changes, variations, modifications, and other uses and applications that do not depart from the spirit and scope of the invention are deemed to be covered by the invention which is limited only by the claims which follow.

What is claimed is:

1. A method of honing a surface of a bore of a workpiece, comprising steps of:

providing a honing tool supported on a spindle for rotation about an axis through the tool and for axial stroking movement, the honing tool having at least one radially expandable honing element;

providing a feed system in connection with the honing tool, including a movable feed element automatically controllably operable for applying a feed force against the honing tool for radially expanding the at least one honing element;

providing a control operable for automatically controlling operation of the feed system;

providing a stroking system operable for axially stroking the honing tool along the axis;

providing a drive for rotating the honing tool about the axis;

providing a device for determining information representative of a feed force applied against the honing tool by the feed element and outputting a signal representative thereof to the control;

providing a device for determining information representative of a position of the feed element and outputting a signal representative thereof to the control;

automatically operating the feed system to move the feed element to radially expand the at least one honing element unrestrained by a surface of a bore, and determining information representative of a baseline feed force required for the expansion;

automatically operating the feed system to move the feed element at a first feed rate to radially expand the at least one honing element within the bore of the workpiece without rotating or stroking the honing tool, so as to initially contact the surface of the bore to cause a responsive increase in the feed force to a level greater than the baseline feed force serving as an indicator of the contact; then automatically radially retracting the at least one honing element to reduce the feed force; and then commencing rotation and stroking of the honing tool while operating the feed system at a second feed rate slower than the first feed rate to radially expand the at least one honing element for contacting and honing the surface of the bore.

2. The method of claim 1, comprising additional steps of automatically determining a value representative of the diameter of the bore as a function of a position of the feed element at a time of the contact with the surface of the bore;

automatically comparing the value representative of the diameter of the bore with a known value, and if greater than the known value, then signaling that the bore is defective.

3. The method of claim 1, wherein the step of determining information representative of a baseline feed force required for the expansion comprises determining a range of values for the feed force.

4. The method of claim 1, wherein the honing element comprises a radially expandable sleeve.

5. The method of claim 1, comprising additional steps of:

automatically honing at least two bores to a predetermined enlarged diameter, including for each of the bores performing the step of operating the feed system to move the feed element to radially expand the at least one honing element so as to contact the surface of the bore, and determining a value representative of the diameter of the bore as a function of a position of the feed element at a time of the contact; and determining a value representative of wear of the at least one honing element as a function of the values representative of the diameters of the bores at the contact and positions of the feed element when the bores are honed to the enlarged diameter.

6. The method of claim 5, comprising a further step of automatically calculating a cost of honing the bores at least in part as a function of the value representative of wear.

7. The method of claim 6, wherein the step of automatically calculating a cost of honing includes calculating the cost additionally as a function of a value representative of a cost of operating the honing machine for honing the bores.

8. The method of claim 6, wherein the step of automatically honing at least two bores comprises automatically selecting different honing parameters for honing the bores to the predetermined enlarged diameter, respectively, and honing the bores to the enlarged diameter using the different honing parameters, and the step of automatically calculating a cost of honing the bores includes calculating a cost for honing each of the two bores.

9. The method of claim 1, wherein the second feed rate comprises a substantially constant rate.

10. The method of claim 1, wherein the second feed rate is selected for controlling the feed force at a substantially constant level.

11. The method of claim 1, wherein the second feed rate is selected for controlling the feed force at varying levels following a predetermined profile.

12. The method of claim 1, wherein the device for determining information representative of the feed force applied against the honing tool by the feed element comprises a load cell disposed between the feed element and the honing tool.

13. The method of claim 1, wherein the device for determining information representative of the position of the feed element comprises an encoder in connection with the feed element.

14. The method of claim 1, wherein the second feed rate comprises variable levels following a predetermined profile.

15. The method of claim 14, wherein the second feed rate varies at levels following a profile which is determined at least in part as a function of the information representative of the feed force.

* * * * *